No. 742,430. Patented October 27, 1903.

UNITED STATES PATENT OFFICE.

FRITZ HOFMANN AND OTTO BONHOEFFER, OF ELBERFELD, GERMANY, ASSIGNORS TO FARBENFABRIKEN OF ELBERFELD CO., OF NEW YORK, N. Y., A CORPORATION OF NEW YORK.

PROCESS OF MAKING TRICHLOROISOPROPYL ALCOHOL.

SPECIFICATION forming part of Letters Patent No. 742,430, dated October 27, 1903.

Application filed June 1, 1903. Serial No. 159,697. (No specimens.)

*To all whom it may concern:*

Be it known that we, FRITZ HOFMANN and OTTO BONHOEFFER, doctors of philosophy, chemists, residing at Elberfeld, Germany, (assignors to the FARBENFABRIKEN OF ELBERFELD COMPANY, of New York,) have invented a new and useful Improvement in Processes of Making Trichloroisopropyl Alcohol, of which the following in a specification.

We have found a new and valuable process for the production of the trichloroisopropyl alcohol having the formula

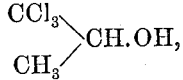

which body, according to our researches, possesses valuable therapeutic, especially soporific, properties.

Our new process for producing this compound consists in first allowing chloral to act on the additional products which can be prepared by the action of a methyl haloid and an ether—*e. g.*, ethyl ether on magnesium—and then decomposing the resulting halogenmagnesium compound of trichloroisopropyl alcohol having the formula

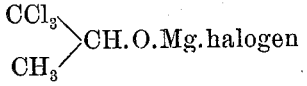

with water.

In order to carry out our new process practically, we can, for instance, proceed as follows, the parts being by weight: Into a vessel provided with a reflux condenser, a stirrer, and a dropping-funnel and containing twenty-four parts of magnesium filings a mixture of ninety-five parts of methyl bromid and three hundred parts of ether (free from water and alcohol) is dropped while cooling and and stirring. A reaction sets in, the magnesium dissolves, the production of the additional compound having the formula

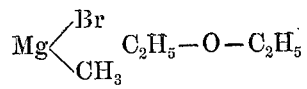

being the result. The solution thus obtained is then slowly added to a mixture of 147.5 parts of chloral (free from water) and three hundred parts of ether (free from water and alcohol) while cooling and stirring. After the reaction is finished the bromomagnesium compound of trichloroisopropyl alcohol is decomposed by the addition of ice water. A suitable quantity of a dilute acid is preferably added in order to dissolve the magnesium oxid precipitated during the decomposition. The ethereal solution which contains the trichloroisopropyl alcohol is dried, the ether is distilled off, and from the remaining oil the trichloroisopropyl alcohol is isolated by a distillation *in vacuo*. It has the melting-point of 48° to 49° centigrade and can be further purified by a recrystallization from ether or ligroin.

Having now described our invention and in what manner the same is to be performed, what we claim as new, and desire to secure by Letters Patent, is—

The herein-described process for the production of trichloroisopropyl alcohol having the above-given formula which process consists in forming an addition compound from a methyl haloid, an ether and magnesium, then reacting with this compound on chloral; secondly decomposing the resulting halogenmagnesium compound and finally isolating the trichloroisopropyl alcohol thus obtained, substantially as hereinbefore described.

In testimony whereof we have signed our names in the presence of two subscribing witnesses.

FRITZ HOFMANN.
OTTO BONHOEFFER.

Witnesses:
OTTO KÖNIG,
J. A. RITTERSHAUS.